United States Patent [19]

Levin

[11] 3,958,504
[45] May 25, 1976

[54] ROASTING PAN
[75] Inventor: Myron M. Levin, Highland Park, Ill.
[73] Assignee: E-Z Por Corporation, Niles, Ill.
[22] Filed: Mar. 26, 1975
[21] Appl. No.: 562,229

[52] U.S. Cl. ................................ 99/426; 99/446;
 126/39 M; 229/3.5 MF
[51] Int. Cl.[2] ........................................ A47J 27/00
[58] Field of Search ............ 99/446, 425, 444, 445,
 99/426, 428, 442; 126/39 M, 25, 390;
 220/72; 229/3.5 MF, 14

[56] References Cited
UNITED STATES PATENTS

| | | | |
|---|---|---|---|
| 75,673 | 3/1868 | Gibson | 99/425 |
| 156,797 | 11/1874 | Jones | 99/425 |
| 1,862,420 | 6/1932 | O'Brien | 99/446 |
| 2,751,840 | 6/1956 | Layton et al. | 99/425 X |
| 2,779,266 | 1/1957 | Trapani | 99/425 |
| 2,951,435 | 9/1960 | Fry | 99/446 X |
| 3,453,949 | 7/1969 | Levin | 99/446 |
| 3,704,142 | 11/1972 | Wilson | 99/446 |

*Primary Examiner*—Leonard D. Christian
*Assistant Examiner*—Arthur O. Henderson
*Attorney, Agent, or Firm*—Max R. Kraus

[57] ABSTRACT

A roasting pan formed of an aluminum foil, in which the base or bottom of the pan is integrally formed to provide spaced upwardly extending projections having rounded top surfaces, which spaced projections form in effect a rack upon which a food product to be roasted is placed so that the product which rests on said upwardly extending projections has minimal contact therewith and elevates the roasting product from the bottom of the pan to permit the liquids, juices, and the like, to flow unimpeded around the bottom of the pan and eliminates the resting of the roasting product in any juices or grease from said roasting product which would otherwise be absorbed by it. By providing the upwardly extending projections as an integral part of the base, the use of a separate roasting rack is eliminated.

3 Claims, 3 Drawing Figures

U.S. Patent May 25, 1976 3,958,504
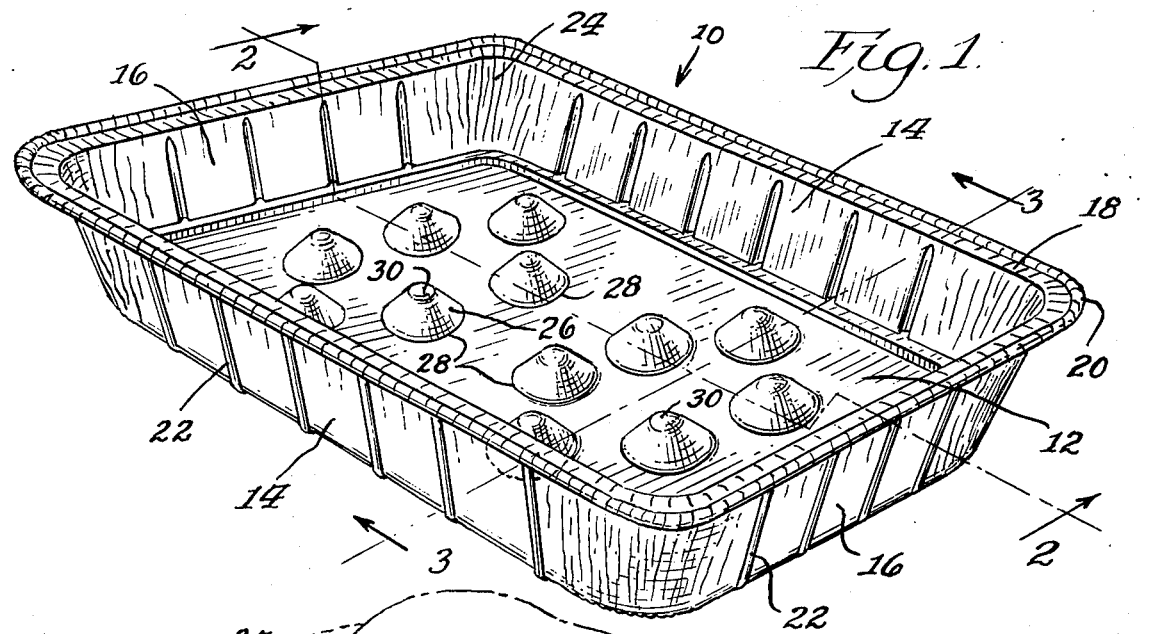
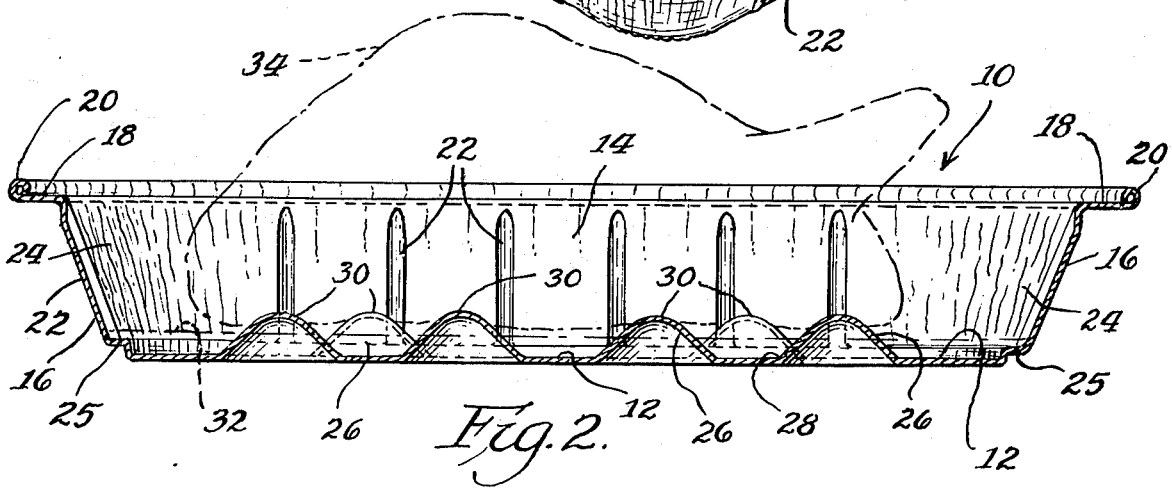
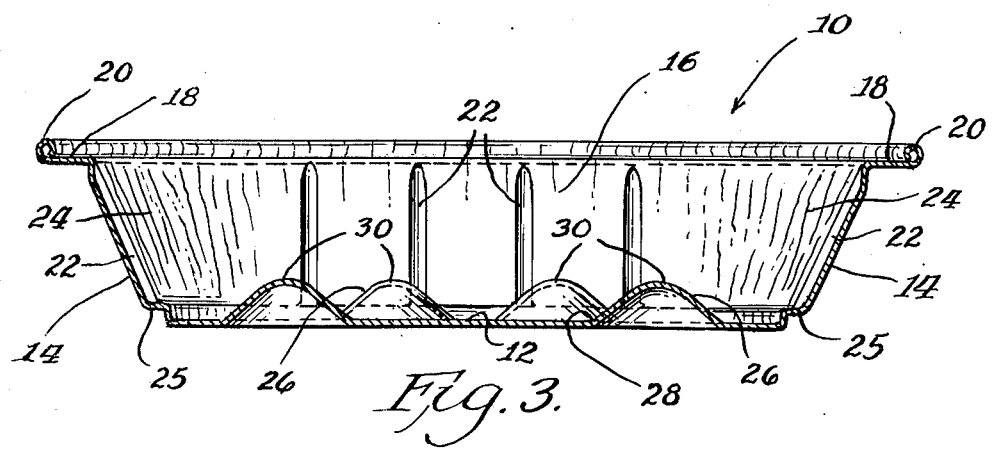

ROASTING PAN

BRIEF SUMMARY OF THE INVENTION

One of the objects of this invention is to provide a roasting pan formed of an aluminum foil in which the bottom thereof has spaced upwardly extending projections or embossings integrally formed therewith so that a food product to be roasted will rest thereon in a spaced relationship to the bottom of the pan so that the juices, liquids and/or grease from the roasting product will collect on the bottom of the roasting pan and will have little or no contact with the surface of the product being roasted, and the side resting on the projections, as well as the rest of the product will be uniformly browned and uniformly roasted.

Heretofore it was the practice to place a wire rack in a roasting pan so that when the product to be roasted was placed on the rack it would be spaced from the bottom of the pan for the purpose of permitting the juices and/or grease to flow to the bottom of the pan and the rack would maintain the roasting product elevated from the bottom of the pan. With this invention the wire rack is eliminated as the bottom of the roasting pan is so formed that it serves as a rack for maintaining the food product to be roasted elevated from the bottom of the pan. The structure which serves as a rack is formed by embossing the material in the bottom of the pan so that it forms spaced raised projections, the projections being shaped to form mounds which rise from the bottom of the pan to a top portion which is rounded at its highest point so that the product to be roasted rests on such rounded surfaces and has minimum contact therewith. These rounded surfaces will not interfere with the browning of all sides of the product to be placed thereon so that the roasting product is uniformly browned even with respect to the surface adjacent the bottom of the pan.

Another object of this invention is to provide a roasting pan and rack integrally formed of an aluminum foil which eliminates the use of a separate roasting rack normally used in connection with roasting pans.

Another object of this invention is to provide a combined roasting pan and means serving as a rack formed from the bottom of the pan which eliminates the cleaning of a separate roasting rack and also provides for a structure which is economical to produce.

BRIEF DESCRIPTION OF THE DRAWINGS

In the drawings:

FIG. 1 is a perspective view of the roasting pan of this invention;

FIG. 2 is a view partly in section taken on lines 2—2 of FIG. 1 and showing in dotted lines a food product to be roasted; and FIG. 3 is a view partly in section taken on lines 3—3 of FIG. 1.

The roasting pan, generally indicated at 10, is integrally formed of aluminum foil and includes a bottom 12 and continuous upstanding side and end walls 14 and 16, respectively, which extend upwardly from the bottom and are inclined upwardly and outwardly. The upwardly extending side and end walls 14 and 16 continue horizontally to form a continuous horizontal ledge indicated at 18 which then is bent and curved to form a continuous bead or border 20 which extends slightly upwardly of the horizontal ledge 18. The side and end walls 14 and 16 are formed with spaced vertical ribs 22 which provide a certain rigidity to said side and end walls. The corners of the adjacent side and end walls are wrinkled as indicated at 24 and said wrinkles extend along the corner horizontal ledge 18 and also to the beaded border indicated at 20.

Between the bottom 12 and the side and end walls 14 and 16 is a continuous bottom horizontal ledge 25, with the plane of the bottom 12 positioned below the horizontal plane of the ledge 25, as best seen in FIGS. 2 and 3, so that the greases and juices from the roasting product are mostly confined in the bottom portion of the pan and below the tops of the projections, hereinafter to be described.

Integrally formed with the bottom of the pan is a plurality of spaced upwardly extending projections or embossings, all generally indicated at 26. These upwardly extending projections or embossings are all of similar configuration and are circular in plan and generally conical and may be described as convexo-concave. The outer periphery 28 of the projections 26 are substantially on the same plane as the bottom 12, but the wall of the projections or embossings 26 rises upwardly and inwardly to a central rounded or curvilinear top 30. This curvilinear top portion provides a surface having a minimal contact with the food product 34 to be roasted. As shown in dotted lines in FIG. 2, the food product 34 to be roasted is placed on said upwardly extending projections or embossings 26 within the pan and it rests with minimal contact on the rounded or curvilinear surfaces 30 of the projections, spacing the food product from the bottom surface 12 of the pan. Thus, as can be readily appreciated, the spacing permits the juices and/or grease from the roasting product to move freely about the bottom of the pan and prevents the food product from lying in its juices or grease within the pan and this eliminates absorption of the grease or juices by the roasting product and permits browning of all sides of the roasting product.

The upwardly extending projections or embossings 26 are spaced from each other around the bottom 12 and are likewise spaced from the sides and ends of the pan so that the juices and/or grease is free to flow to the sides and ends of the roasting pan without interference. The juices and/or grease in the pan will fill the bottom of the pan up to the level indicated at 32, which would be below the top of the rounded surfaces of the projections or embossings 26, thus the bottom of the roasting product 34 would be above the plane of the juices or grease flowing from the roasting product as said juices and/or grease will flow or roll down the inclined walls of the projections or embossings 26 to the bottom of the pan leaving the roasting product free from contact with such juices and/ or grease. This improves the roasting, provides uniform browning of the roasting product and speeds up the roasting process.

What is claimed is:

1. A roasting pan integrally formed of an aluminum foil material and comprising a flat bottom and upstanding side and end walls, said bottom having a plurality of spaced upwardly extending convexo-concavo projections or embossings formed therein having a rounded top portion on which a food product to be roasted rests when positioned in said pan so that the roasting product has minimal surface contact with the surface on which it rests and is elevated and spaced from the flat bottom to permit the juices and/or grease from the roasting product to collect on the bottom of the pan and flow freely on said bottom, the rounded top portions of said plurality of projections being on the same horizontal plane, said projections maintaining the roasting product out of contact with the juices and/or greases in the pan.

2. A roasting pan as set forth in claim 1 in which a continuous bottom ledge is formed between the side and end walls and the flat bottom, which ledge is on a horizontal plane above the plane of the flat bottom and in which said bottom ledge is below the plane of the tops of said projections or embossings.

3. A roasting pan as set forth in claim 2 in which the side and end walls are provided with spaced vertical ribs formed in said walls to rigidify said walls.

* * * * *